United States Patent [19]
Barenboim et al.

[11] Patent Number: 5,951,891
[45] Date of Patent: Sep. 14, 1999

[54] OPTICAL APPARATUS FOR MONITORING PROFILES OF TEXTURED SPOTS DURING A DISK TEXTURING PROCESS

[75] Inventors: Michael Barenboim, Boca Raton, Fla.; Peter Michael Baumgart, San Jose, Calif.; Pieter J. M. Kerstens, Boca Raton; Huizong Lu, Coconut Creek, both of Fla.; Iraj Kahkesh Pour, Milpits, Calif.; Eric Von Schnetzer, Boynton Beach; Hong S. Seing, Boca Raton, both of Fla.; Andrew Ching Tam, Saratoga, Calif.

[73] Assignee: International Business Machines Corporation, Armonk, N.Y.

[21] Appl. No.: 08/823,273

[22] Filed: Mar. 24, 1997

[51] Int. Cl.⁶ .............. B23K 26/00; G01B 11/30
[52] U.S. Cl. .............. 219/121.68; 219/121.76; 219/121.83; 356/359
[58] Field of Search .............. 219/121.68, 121.69, 219/121.76, 121.83; 356/345, 359, 360; 360/135; 264/400; 427/554, 555

[56] References Cited

U.S. PATENT DOCUMENTS

| 5,062,021 | 10/1991 | Ranjan et al. | 360/135 |
|---|---|---|---|
| 5,108,781 | 4/1992 | Ranjan et al. | 427/53.1 |
| 5,120,927 | 6/1992 | Williams et al. | 219/121.68 |
| 5,334,849 | 8/1994 | Thomas et al. | 356/445 |
| 5,469,259 | 11/1995 | Golby et al. | 356/359 |
| 5,539,213 | 7/1996 | Meeks et al. | 356/376 |
| 5,550,696 | 8/1996 | Nguyen | 360/135 |
| 5,557,399 | 9/1996 | De Groot | 356/357 |
| 5,567,484 | 10/1996 | Baumgart et al. | 427/555 |
| 5,586,040 | 12/1996 | Baumgart et al. | 364/474.08 |
| 5,595,791 | 1/1997 | Baumgart et al | 427/554 |
| 5,699,160 | 12/1997 | Barenboim et al. | 356/359 |

FOREIGN PATENT DOCUMENTS

| 3942896 | 6/1991 | Germany | 356/359 |
|---|---|---|---|
| 5-209735 | 8/1993 | Japan | 356/359 |

OTHER PUBLICATIONS

Instruction Manual for Model 7300 Laser Systems, Spectra Physics, Mountain View, CA, No date.

*Primary Examiner*—Geoffrey S. Evans
*Attorney, Agent, or Firm*—Richard A. Tomlin; Ronald V. Davidge

[57] ABSTRACT

A disk texturing tool is used, for example, to provide textured spots in an annular portion of both sides of a hardfile disk. An optical system includes a laser directed at a beamsplitter to split the laser beam into two beams having approximately equal power, which are directed along parallel paths through a power control optics block to expose simultaneously opposite sides of a disk to be textured. A visible laser beam is also directed along this optical system to an inspection spot on each side of the disk, by which a central portion of each textured spots passes. A beam angle detector detects deflection of a reflection of the inspection beam from this spot in the direction of motion of the disk at this spot. This deflection provides a measure of the topography of the spot.

17 Claims, 9 Drawing Sheets

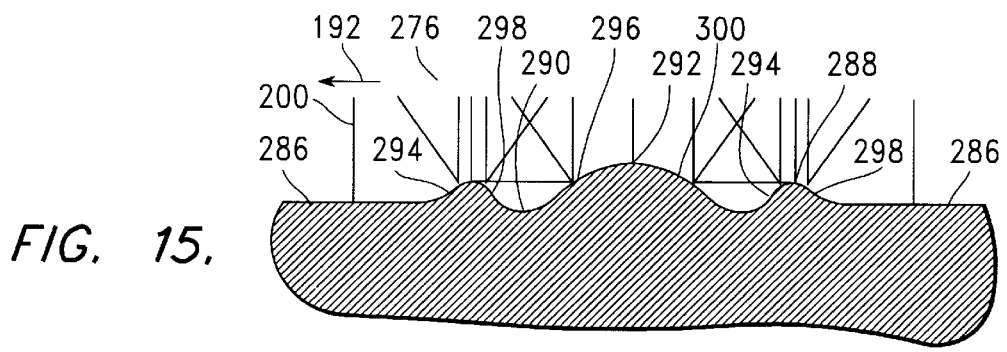
FIG. 15.
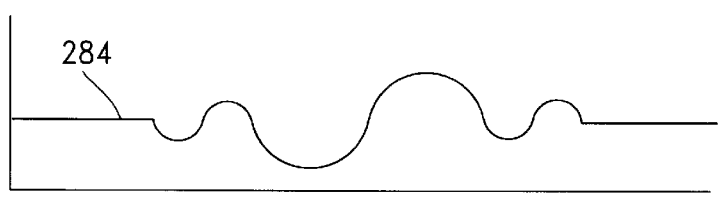
FIG. 16.
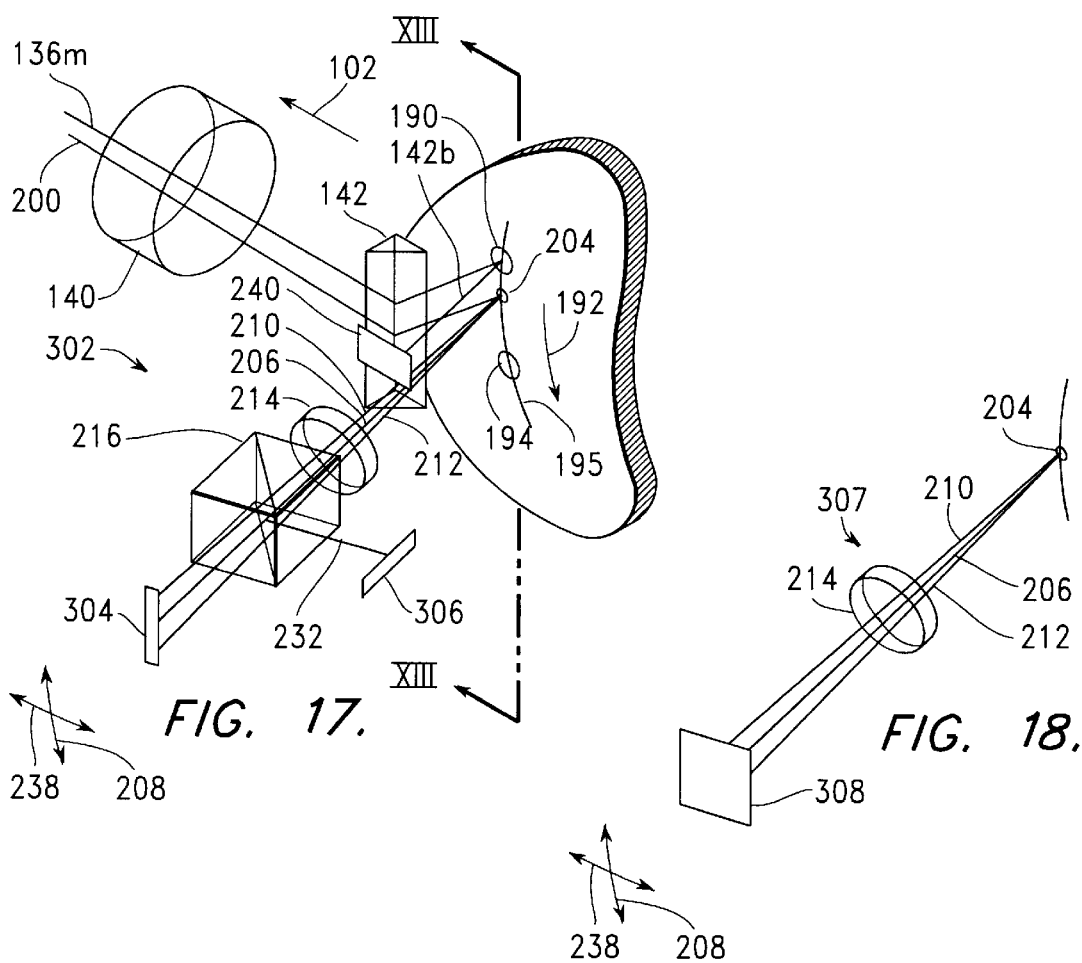
FIG. 17.
FIG. 18.

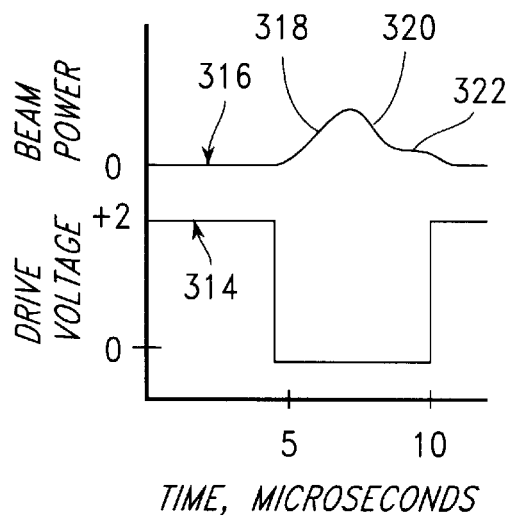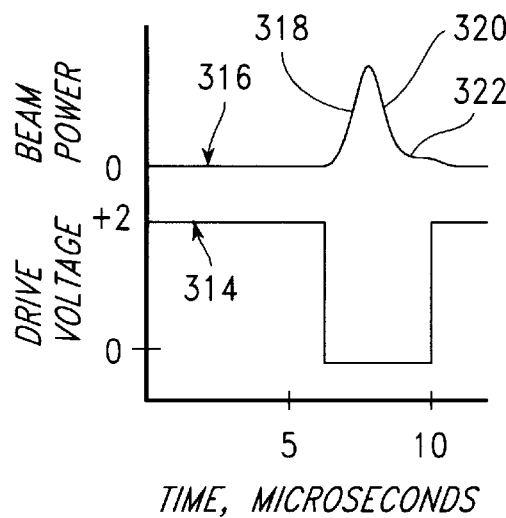
FIG. 20.  FIG. 21.
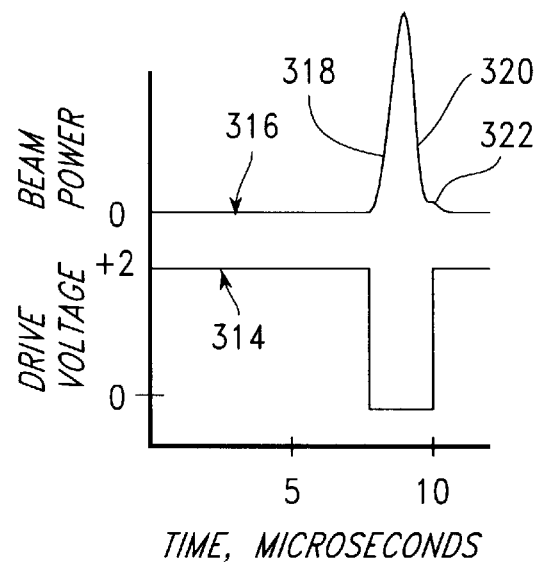
FIG. 22.

OPTICAL APPARATUS FOR MONITORING PROFILES OF TEXTURED SPOTS DURING A DISK TEXTURING PROCESS

CROSS-REFERENCE TO RELATED APPLICATIONS

A co-pending U.S. Application which has issued at U.S. Pat. No. 5,768,076, and a co-pending U.S. application, and Ser. No. 457,559, filed Jun. 1, 1995, entitled "Procedure Employing a Diode-Pumped Laser for Controllably Texturing a Disk Surface," by Peter M. Baumgart, et al., having a common assignee with the present invention, which are hereby incorporated by reference, describe a process for creating a "distant bump array" surface texture in a magnetic recording disk for reducing stiction, together with the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density.

Another co-pending U.S. application which has issued as U.S. Pat. No. 5,658,475, having a common assignee with the present invention, which is hereby incorporated by reference, further describes a laser texturing station in which the optical apparatus of the present invention may be used.

Another co-pending U.S. application, Ser. No. 08/707,383, filed Sep. 4, 1996, entitled "Optical Apparatus for Dual Beam Laser Texturing," having a common assignee with the present invention, which is hereby incorporated by reference, describes a disk texturing system with a laser directed at a beamsplitter to split the laser beam into two beams having approximately equal power, which are directed along parallel paths through a power control optics block to expose simultaneously opposite sides of a disk to be textured. The power control optics block includes means for attenuating and measuring each of the two beams.

Another co-pending U.S. application, Ser. No. 08/707,384, filed Sep. 4, 1996, entitled "Apparatus and Method for Controlling a Laser Texturing Tool," and having a common assignee with the present invention, which is hereby incorporated by reference, describes both electronic hardware and software used to control a laser texturing station in which the optical apparatus of the present invention may be used.

Another co-pending U.S. application, which has issued as U.S. Pat. No. 5,830,514, and having a common assignee with the present invention, which is hereby incorporated by reference, describes a method for controlling the texturing laser used with the optical apparatus of the present invention to produce pulses having varying properties.

Another co-pending U.S. application, which has issued as U.S. Pat. No. 5,790,433, and having a common assignee with the present invention, which is hereby incorporated by reference, describes a program for setting and maintaining the laser power levels in the optical apparatus of the present invention.

Another co-pending U.S. application, which has issued as U.S. Pat. No. 5,699,160 and having a common assignee with the present invention, which is hereby incorporated by reference, describes the use of interferometric apparatus to determine the profile of textured spots. The interferometric apparatus can be mounted within a separate inspection tool or within the laser texturing tool.

Another co-pending U.S. application, which has issued as U.S. Pat. No. 5,822,211, and having a common assignee with the present invention, which is hereby incorporated by reference, describes a process for texturing two groups of disks on two separate spindles, with at least one parameter controlling the texturing process being controlled independently for disks being textured on each of the spindles.

BACKGROUND OF THE INVENTION

1. Field of the Invention

This invention relates to apparatus for measuring a textured surface of a magnetic disk, and, more particularly to apparatus for using detection device sensitive to angles at which light from a visible laser is reflected from a disk surface being textured to determine profile data within a texturing tool.

2. Background Information

Current hard disk drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

What is needed is an effective way to monitor the profile of individual spots as they are textured.

3. Description of the Prior Art

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

U.S. Pat. Nos. 5,567,484 and 5,595,791, to Baumgart, et al., describe a process for creating an array of bumps to texture a brittle nonmetallic surface, such as a glass substrate for data recording disks. The texturing process uses a laser to provide pulses of proper energy fluence to the brittle glass surface to produce a plurality of raised bumps on the surface. The bump creation is accomplished without unwanted micro-cracking or ejection of surface material by limiting the laser pulse fluence to a value in a narrow operating region discovered below the abrupt thermal shock fluence threshold for the brittle nonmetallic surface material. The process is also applicable to other brittle surface textures, such as those intended for use as "stamping surfaces" for the contact reproduction of the negative of a surface pattern, such as an optical disk.

U.S. Pat. No. 5,586,040, to Baumgart, et al., describes controlled laser texturing of a magnetic recording disk as being accomplished by use of a textured test band on the disk and an analyzing laser system to provide feedback to the texturing laser. The analyzing laser system determines, from diffracted laser light, the average height of the laser-induced bumps formed in the test band by the texturing laser. The analyzing laser beam is directed to the substrate surface and overlaps a group of individual bumps formed in a repetitive pattern. A scanning linear photodetector array receives light diffracted from the surface. The digitized output of the array is the angular distribution of diffracted light intensities and is used to compute the average height of the bumps in the test band. The disk is then translated radially so that the texturing laser is aligned with the region of the disk where the textured landing zone is to be placed. Then, in response to the computed value of average bump height in the test band, a correction signal is output to modify one or more parameters of the texturing laser, so that the texturing laser can form bumps of the correct average height in the textured landing zone.

SUMMARY OF THE INVENTION

In accordance with an aspect of this invention, apparatus is provided for applying a textured pattern to a substrate surface and for determining topographic properties of the textured pattern. The apparatus includes a texturing mechanism, a drive mechanism, and projection mechanism, and a primary angle detection mechanism. The texturing mechanism forms a number of textured spots on the substrate surface at a texturing location within the apparatus. The drive mechanism moves the substrate surface past the texturing location along a predetermined path. The projection mechanism projects a detectable beam to an inspection point along the predetermined path, with central portions of the textured spots moving past the inspection point in a first direction. The primary beam angle detection mechanism detects deflection of a reflection of the detectable beam from the substrate in, and opposite to, the first direction.

BRIEF DESCRIPTION OF THE DRAWINGS

FIG. 15 is a cross-sectional view of a textured spot, including a bump surrounded by a ridge, formed on a disk surface, showing the reflection of light rays within the beam angle detector of FIG. 10;

FIG. 16 is a graphical view of a signal provided by a photodetector within the beam angle detector of FIG. 10, in response to the passage of a the textured spot of FIG. 12;

FIG. 17 is an isometric view of an alternative beam angle detector for generating a signal indicating characteristics of a textured spot formed on a disk within the tool of FIG. 4;

FIG. 18 is an isometric view of a second version of the beam angle detector of FIG. 17;

FIG. 20 is a graphical view of a pulse emitted by the pulsed laser within the device apparatus of FIG. 19, at a repetition rate of one pulse per 10 microseconds with a radio frequency signal being driven into a Q-switch in the laser for 4.5 microseconds between pulses;

FIG. 21 is a graphical view similar to FIG. 20, except that the radio frequency signal is driven for 6.0 milliseconds between pulses; and FIG. 22 is a graphical view similar to FIG. 20, except that the radio frequency signal is driven for 7.5 milliseconds between pulses.

DETAILED DESCRIPTION

Figure 1:
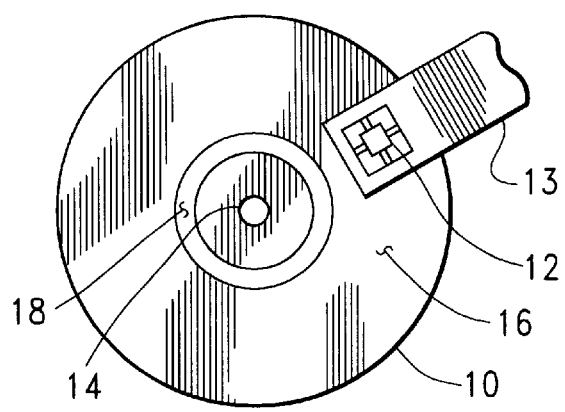
FIG. 1 is a plan view of an internal portion of a prior-art disk drive unit, including a rotatable magnetic disk having a textured annular region for CSS operation, and a magnetic head.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

Figure 2:
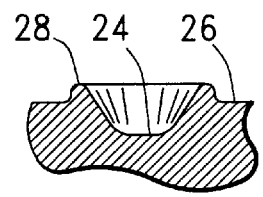
FIGS. 2 and 3 are transverse cross-sectional views of individual textured spots, which form examples of spots which may be made using the apparatus of the present invention, with the spot of FIG. 2, being formed particularly according to the method of U.S. Pat. No. 5,108,781, and with the spot of FIG. 3 being formed particularly according to the method of U.S. Application, Ser. No. 08/150,525, now abandoned in view of U.S. Ser. No. 08/601,887, now U.S. Pat. No. 5,768,076.
Figure 3:
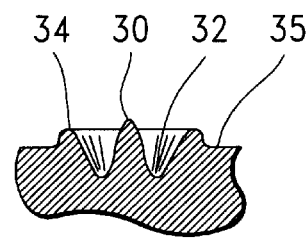

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired, together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described U.S. patent application, Ser. No. 08/150,525, now abandoned in view of U.S. Ser. No. 08/601,887, now U.S. Pat. No. 5,768,076. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

Figure 4:
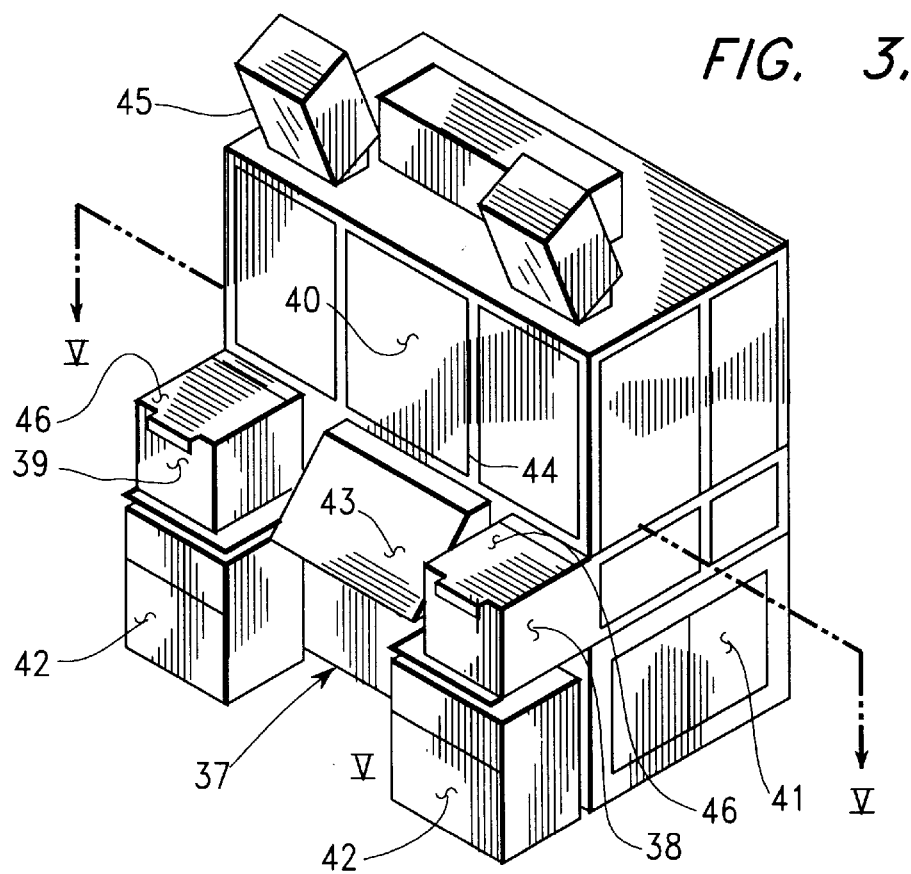
FIG. 4 is an isometric view of a laser disk texturing tool built in accordance with the present invention.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
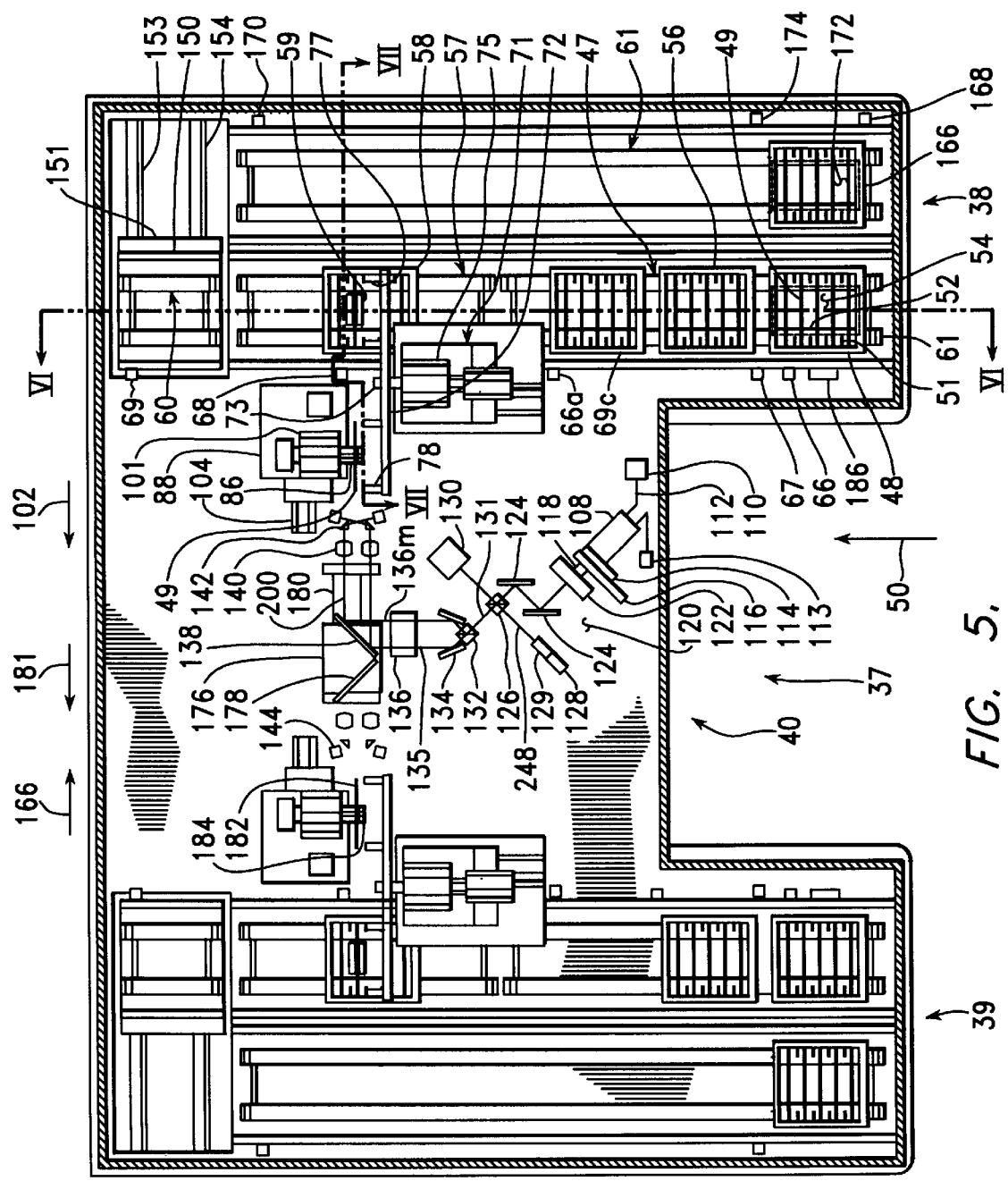
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figure 6:
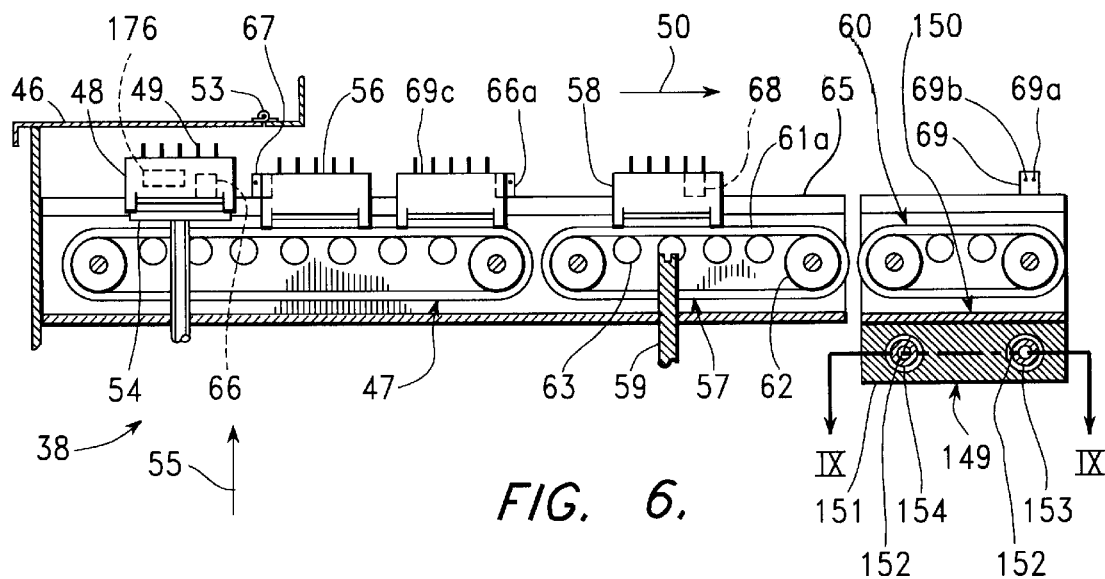
FIG. 6 is a cross-sectional side elevational view of the tool of FIG. 4, taken as indicated by section lines VI—VI in FIG. 5 to show mechanisms used to handle cassettes holding disks for texturing.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

Figure 7:
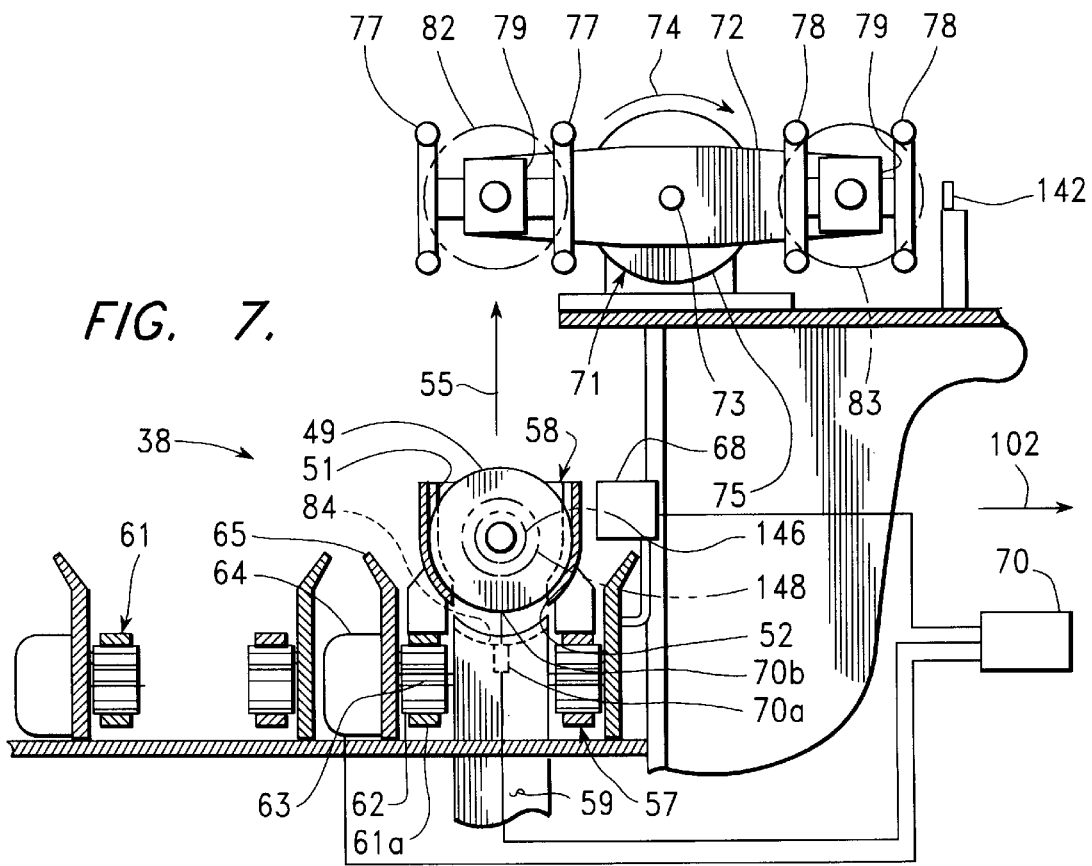
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 7 is a cross-sectional rear elevational view of the tool of FIG. 4, taken as indicated by section lines VII—VII in FIG. 5 to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carried into the texturing process will now be discussed, with particular reference being made to FIGS. 6 and 7.

Thus, referring to FIGS. 5, 6, and 7, each conveyor 47, 57, 60, 61 includes a belt 61a extending under each side of a cassette 48, 56, 58 loaded thereon. Each belt 61a extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66a, 67, 68, 69, which determine when a cassette reaches an adjacent point along a conveyor system. Each cassette detector 66, 66a, 67, 68, 69 includes a light source 69a which is reflected off an adjacent surface of a cassette when such a surface is present, to be detected by a receiver 69b, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69c are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69c is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66a, leaving the cassette queued on the input conveyor 47, in the position in which cassette 69c is shown.

If a cassette 58 is present on indexing conveyor 57, and if a single cassette 69c is present on input conveyor 47, when cassette 48 is placed on raised platform 54, this platform 54 remains raised while input conveyor 47 is turned on to move cassette 69c opposite the direction of arrow 50 until this cassette 69c is sensed by third cassette sensor 67. Then, platform 54 is lowered, and input conveyor 47 is turned on to move both cassettes 48, 69c in the direction of arrow 50. This movement is stopped when cassette 69c is detected by second cassette sensor 66a, leaving both cassettes 48, 69c queued on input conveyor 47.

Finally, if all three cassettes 56, 69c, and 58 are present on conveyors 47, 57 when cassette 48 is placed on raised platform 54, the movement of cassettes does not directly ensue, leaving cassettes 56, 69c queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70a, for determining whether a disk 49 is present in each pocket 51. This sensing mechanism 70a consists of an internal light source aimed at an adjacent edge 70b of a disk present in a pocket 51 and an internal sensor detecting light reflected from such an edge 70b. The output of sensing mechanism 70a provides an additional input to computing system 70. Thus, cassette 58 is moved to the rear, in the direction of arrow 50, by indexing conveyor 57, until proximity sensing mechanism 70a indicates the presence of a disk 49 in a particular pocket 51, passing any empty pockets 51 within the cassette 58. When a disk is detected by proximity sensing mechanism 70a, the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

Figure 8:
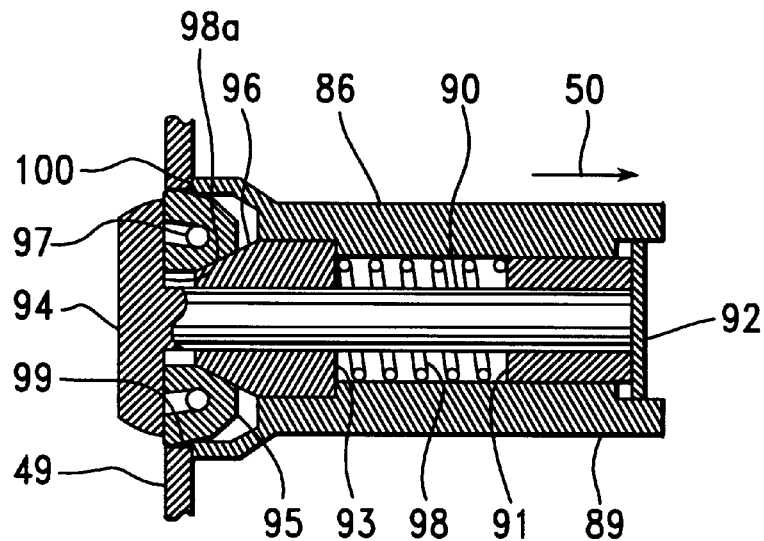
FIG. 8 is a longitudinal cross-sectional view of an end portion of a spindle, used to move disks through the texturing process in the tool of FIG. 4.

FIG. 8 is a longitudinal cross-sectional view of the end of spindle 86, which includes a rotationally-driven outer cylinder 89, in which an internal shaft 90 slides axially, in and opposite the direction of rearward-pointing arrow 50. A sliding bushing 91 and a piston 92, and a front end cap 94 move axially with internal shaft 90, while a front bushing 93 is held in place within the outer cylinder 89. A number of curved clamping blocks 95 extend around a truncoconical surface 96 of front bushing 93, being held inward, against this surface 96, by an elastomeric "O"-ring 97.

The internal shaft 90 is held in the rearward position shown (i.e. in the direction of arrow 50) by means of a compression spring 98 pressing an adjacent surface of the sliding bushing 91. With internal shaft 90 held rearward in this way, inner face 98a of end cap 94 pushes clamping blocks 95 rearward and outward, along truncoconical surface 96. This motion of the clamping blocks 95 grasps inner surface 99 of the disk 49, holding the disk in place against a front face 100 of outer cylinder 89. The disk 49 is released by applying a force to piston 92 in a forward direction, opposite the direction of arrow 50, to overcome the force exerted by compression spring 98, so that the internal shaft 90 is moved forward, opposite the direction of arrow 50. This force may be applied by a number of well known methods, such as through a pneumatically operated push-rod operating on piston 92. The resulting movement of end cap 94 allows the clamping blocks 95 forward and inward, releasing disk 49 from the spindle 86.

Referring to FIGS. 5, 7, and 8, pick-and-place mechanism 71 next moves to the rear, in the direction of arrow 50, placing the disk 49 to be textured, which is now at the position indicated by phantom line 83 in FIG. 7, on end cap 94 of spindle 86, with inner shaft 90 held in its forward position, so that clamping blocks 95 are retracted inward.

Next, inner shaft 90 is moved to its rearward position, so that clamping blocks 95 are moved outward, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a ND:YLF solid state laser, providing an output at a wavelength of 1.047 microns, or Nd:YVO$_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. When the laser-texturing station 40 is operating, a train of laser pulses is emitted from the laser 108, with the actual texturing process being started and stopped by opening and closing the electronic process shutter 114.

The process shutter 114 is actually a mechanical shutter which is opened and held open by the operation of an electromagnet (not shown). The termination of the flow of current through the electromagnet causes the process shutter to close. The operation of process shutter 114, and hence of the process of texturing an individual disk, is electronically controlled in response to the position of the disk to be textured, as determined through the use of a signal generated in response to the movement of, for example, the spindle assembly 88.

The safety shutter 116 remains open during the entire texturing process, unless an error condition, such as a jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114, 116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3X beam expander/collimator 122, which permits the adjustment of the infrared laser spot size at a lens entrance.

Figure 5A:
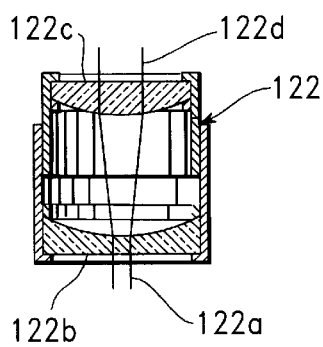
FIG. 5A is a longitudinal cross-sectional view of a beam expander in the tool of FIG. 4.

FIG. 5A is a longitudinal cross-sectional view of the beam expander/collimator 122. The input beam 122a passes through a diverging lens 122b, which causes the divergence, or expansion, of the beam, and through a converging lens 122c, which reduces the divergence of the beam leaving as output beam 122d. The distance between the beam expander lenses 122b, 122c is manually adjustable through the rotation of a threaded mechanical connection between the lens mounts. In the example of the laser-texturing tool 37, this adjustment is made to provide a slightly diverging output beam 122d.

Referring again to FIG. 5, from expander collimator 122, the laser beam is directed by a pair of dielectric-coated steering mirrors 124 to a dichroic beamsplitter 126. A visible laser beam, for example from a 5-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124, in an alignment process which is preformed with the beam expander 129 removed from the light path. This beam expander 129 is used, in a manner which will be described in reference to FIG. 10, to vary the properties of the red beam from laser diode 128 so that it can be used to examine the profile of textured spots formed on the surface of a disk 49. About three percent of the laser beam entering beamsplitter 126 from the infrared laser 108 is reflected from the beamsplitter 126 to a power detector 130, which provides in-situ monitoring of the laser power.

The infrared laser beam 131 leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams 135, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

Figure 5B:
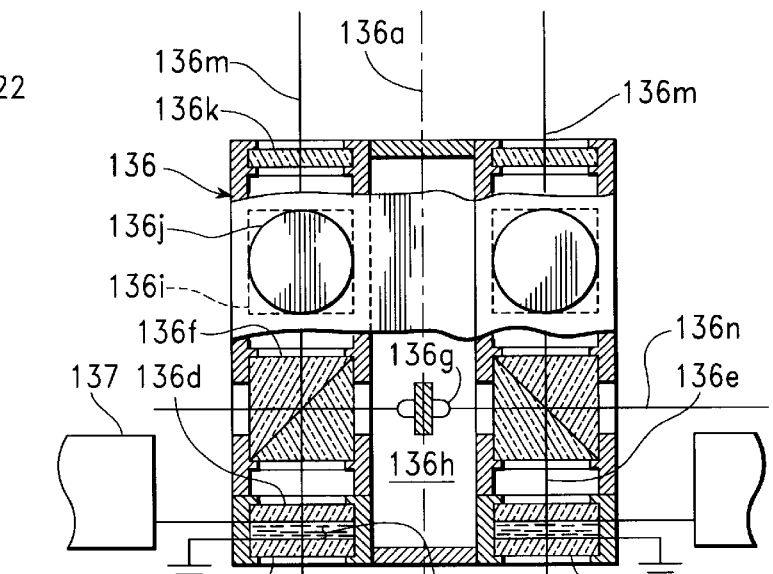
FIG. 5B is a partially sectional plan view of a beam splitter and power control optics block in the tool of FIG. 4.
Figure 5B:
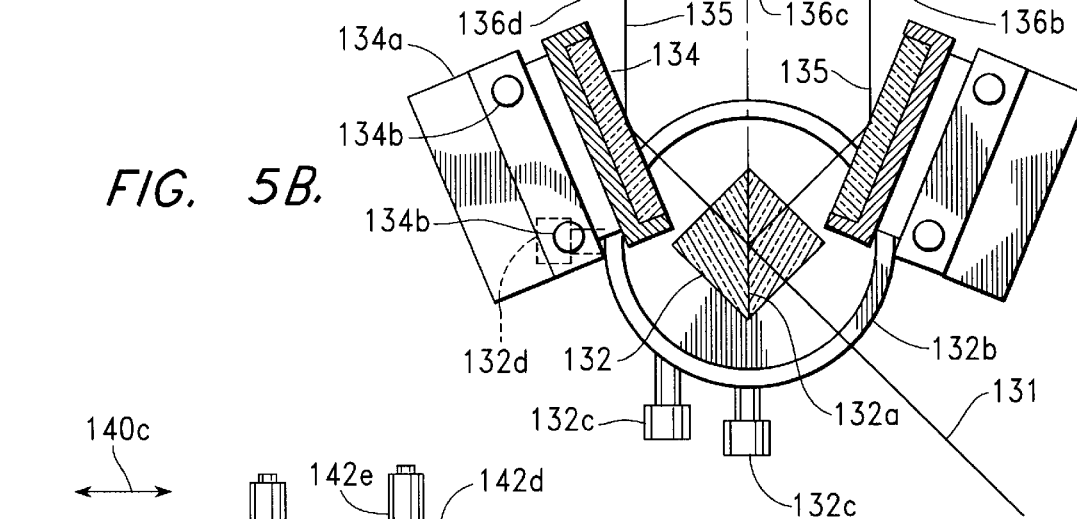

FIG. 5B is a partially sectional plan view of the beamsplitter cube 132, together with steering mirrors 134 and the power control optics block 136. The two laser beams 135 forming inputs to the block 136 extend parallel to, and equally offset from, an axis 136a of the power control optics block 136, about which the various elements of this block 136 are symmetrically deployed. Symmetrical beams 135 result from the fact that the input beam 131 to the beamsplitter cube 132 is directed at a 45-degree angle with respect to the optics block axis 136a, with the reflective surface 132a within the beamsplitter cube being aligned along the optics block axis 136a. Each of the steering mirrors 134 is aligned to be struck by an associated beam from the beamsplitter cube 132 at an angle of incidence of 67.5 degrees.

Referring to FIG. 5B, adjustments for bringing the separate laser beams 135 into a parallel condition, and for otherwise aligning them, are provided by several manually turned knobs. Beamsplitter cube 132 is mounted on a rotary stage 132b, with a pair of knobs 132c tilting the cube 132 about orthogonal axes, and with a knob 132d providing for the rotation of the cube 132. For example, a rotary stage suitable for this application is supplied by the Newport Corporation of Irvine, Calif., under their part number PO32N. Each steering mirror 134 is mounted by an adjustable mirror mount 134a, which includes a pair of knobs 134b used to tilt the associated mirror 134 about mutually perpendicular axes. Mirror mounts suitable for this application are supplied, for example by the Ealing Electro Optics, Inc. Holliston, Mass., under their catalog number 37-4777.

Within the power control optics block 136, the power of the two beams 135 from beamsplitter cube 132 is balanced, so that these beams have power levels within one percent of one another. The beamsplitter cube 132 splits the single beam arriving from the laser into a pair of beams 135 having power levels within five percent of one another. While the beamsplitter cube 132 is a non-polarizing device, the laser beams 135 entering the power control optics block 136 are nominally, or predominately, s-polarized, having passed through polarizing beamsplitter 118 (shown in FIG. 5).

Within the power control optics block 136, each of these beams 135 first enters a liquid crystal variable retarder 136b. Each of these retarders 136b includes a cavity 136c formed between a pair of fused silica windows 136d spaced a few microns apart. The interior surface of each window 136d has a transparent conductive indium tin oxide coating. The cavity 136c is filled with birefringent nematic liquid crystal material with molecules that tip according to a voltage applied between the transparent conductive coatings of the windows 136c. The angle of polarization of the laser beam 135 entering each retarder 136b is changed according to the voltage applied across the cavity 136c by means of the coatings on windows 136d. Thus, the s-polarization of each beam 135 entering a retarder 136b is altered, in a continuously variable manner, toward a p-polarization of the beam 136e leaving the retarder 136b. A suitable liquid crystal variable retarder may be obtained, for example, from Meadowlark Optics, of Longmont, Colorado, under their part number LVR-100-1047-V.

The voltage signal driving each liquid crystal variable retarder 136b is provided by the output of a function generator 137, which preferably produces a DC-balanced 2 kHz square wave having an amplitude which is adjustable to determine how the polarization of the beam passing through the retarder 136b is altered.

After exiting the retarder 136b, each beam 136e enters a polarizing beamsplitter 136f, which reflects s-polarized power inward to a beam dump 136g to be dissipated within a cavity 136h, while transmitting p-polarized energy to an non-polarizing beamsplitter 136i. Each non-polarizing beamsplitter 136i reflects about one percent of the energy incident upon it upward, providing the input to a power detector 136j. The remaining energy is transmitted through a quarter-wave plate 136k, which converts the p-polarized energy incident upon it into a circularly-polarized beam 136m exiting the power control optics block 136.

Referring to FIGS. 5 and 5B, independent means to measure and control the power levels of the single beam 135 derived from the output of laser 108 and of each of the beams 136m exiting the power control optics block 136 are provided. The power level of the single beam 131, which is measured by monitoring the output of power detector 130, is controlled, or attenuated, by varying an input signal to laser 108. The combination of a retarder 136b with a polarizing beamsplitter 136f provides a convenient way to control the power level of each beam 136m exiting the block 136, while the combination of a non-polarizing beamsplitter 136i with a power detector 136j provides a convenient means for measuring this power level. The output signals from power detectors 130, 136j are individually calibrated using measurements of beams 136m at the exit of the power control optics block, or farther along the optical path toward the point at which a disk 49 is textured. This type of calibration is generally needed because of a number of factors, such as differences in the percentage of incident power reflected within the beamsplitters 126, 136i aiming beams at these power detectors. The outputs of power detectors 130, 136j are preferably displayed externally on the laser texturing tool 37 (shown in FIG. 4).

A method for manually setting-up or readjusting the various laser power levels includes the steps of monitoring the outputs of power detector 130 and making corresponding adjustments to a signal driving the laser 108. The two beams 136m are balanced by observing the outputs of both power detectors 136j with both retarders 136b set to transmit maximum levels of p-polarized power, and by reducing the level of p-polarized power transmitted by the retarder corresponding to the higher power level read by one of the power detectors 136j, until these two detectors indicate the same power level, with calibration factors being considered. As the level of p-polarized power is decreased in either of the beams, the level of power present in the corresponding output beam 136m is decreased, as the increased s-polarized power is rejected inward by the polarizing beam splitter 136f. In this way, the output levels of the two beams are balanced by attenuating the beam initially having the higher level.

In the example of FIG. 5, the parallel laser beams 136m from power control optics block 136 are reflected off a right shuttling mirror 138, being directed toward a disk carried through the texturing process from the right disk-handling station 38.

Figure 5C:
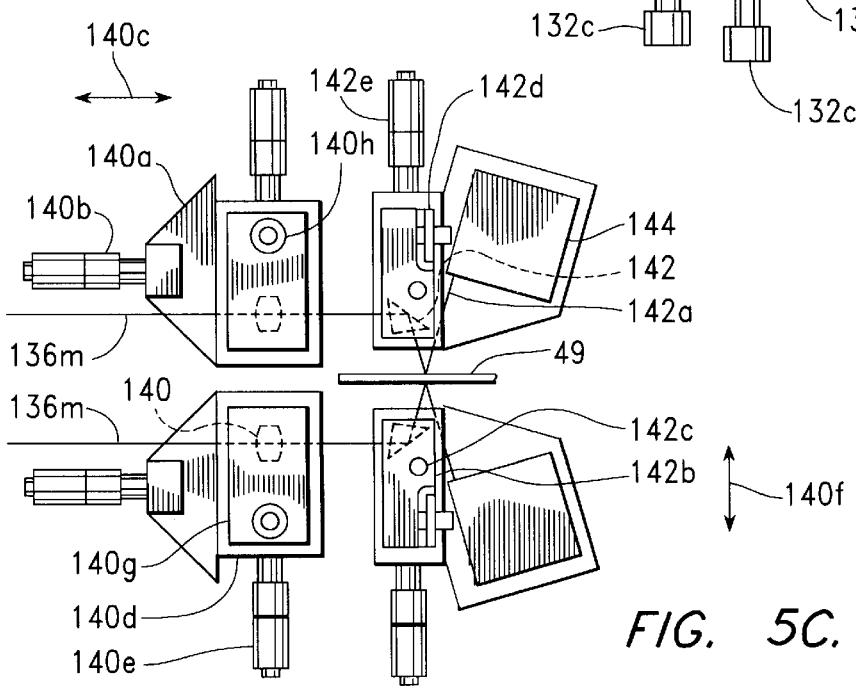
FIG. 5C is a plan view of beam directing apparatus adjacent a disk being textured within the tool of FIG. 4, together with optical devices used to measure the profile of spots formed during the texturing process.

FIG. 5C is a plan view of the optical devices associated with the right disk-handling station 38. For example, each of these beams 136m passes through a focussing achromatic triplet lens 140, having a focal length of 25 mm, and is reflected toward the surface of the disk 49 being textured by a right-angle prism 142.

Referring to FIG. 5C, each lens 140 is mounted in a finely adjustable manner, permitting the adjustments needed to center the beam and to achieve optimum focus on each side of the disk 49. A first stage 140a, moved by a first micrometer-type screw mechanism 140b allows a lens focussing adjustment in the directions of arrow 140c. A second stage 140d, moved by a second screw mechanism 140e, allows lateral movement of the lens 140, in the directions indicated by arrow 140f. A third stage 140g, in which the lens 140 is mounted, allow vertical movement through the rotation of a third mechanism 140h.

Each prism 142 is slightly tilted, so that a laser beam reflected off the surface of the disk being textured is not transmitted back through the optical path, being instead generally reflected outward as a reflected beam 142a. Each prism 142 is mounted on a pivot arm 142b, pivotally mounted by a pin 142c to a stage 142d, which is in turn moved in the directions of arrow 140f by a micrometer-type screw mechanism 142e. The pivotal movement of each pivot arm 142b may be used to set the point on the disk 49 at which texturing begins. This type of adjustment is particularly useful for adjusting the process to produce textured surfaces on each side of the disk 49, starting and ending at the same diameters on the disk. When this is done, since the pivot pin 142c is offset from the reflective surface of the prism 142, the laser beam is expected to move along this reflective surface. If this movement displaces the laser beam too far from the center of this reflective surface, the position of prism 142 is corrected with screw mechanism 142e.

A photodetector 144 is also adjustably mounted adjacent each prism 142 for monitoring the profile of each textured spot through the use of a visible beam projected adjacent to the texturing beam 136m. This measuring system will be explained in reference to FIG. 10.

Referring again to FIGS. 5 and 5A, and continuing to refer to FIG. 5C, beam expander 122 is adjusted by changing the distance between 122b and lens 122c, during the initial adjustment of this apparatus, so that the laser beam 122a entering the beam expander 122 at a diameter of about 0.5 mm leaves the beam expander 122 as beam 122d with a diameter of about 1.3 mm, and so that the beam entering a focussing lens 140 has a diameter of about 1.5 mm. This lens 140 is focussed by movement in the direction of arrow 140c, using the screw mechanism 140b, so that the laser beam has a diameter of about 20 microns at the surface of a disk 49 being textured. An independent adjustment of this kind is made to focus a beam on each side of the disk 49.

Further adjustments of the beam expander 122 and of each focussing lens 140 may be made to effect changes in the process and in the textured spots generated on the disk 49. In general, adjusting the beam expander 122 to increase the diameter of the laser beam striking each focussing lens 140 makes it possible to focus a smaller beam diameter on the disk 49.

Referring to FIGS. 5, 5B, and 5C, despite the precaution of tilting each prism 142, to prevent the return of laser power reflected off the disk 49 within the optical path, some such power can be expected to return, due particularly to reflection from the non-uniform disk surface produced by the texturing process. However, the s-polarized light reflected back along the optical paths in this way is rejected by each polarizing beamsplitter 136f in the power control optics block 136, being directed outward as a beam 136n.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surfaces to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor 70a in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor 70a. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. Within the spindle 86, shaft 90 (shown in FIG. 8) is moved to the front, moving clamping blocks 95 inward to disengage the spindle from the "A" disk 49, and the disk lifter 59 moves downward to disengage from the "B" disk 49. Next, the pick-and-place mechanism 71 moves forward, opposite the direction of arrow 50, and the arm rotational drive motor 75 drives arm 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50..

Next, disk lifter 59 moves upward, engaging "A" disk 49 within its groove 84, and the shaft 90 (shown in FIG. 8) is moved rearward, in the direction of arrow 50, so that clamping blocks 95 are extended outward to hold "B" disk 49 (also shown in FIG. 8) on the spindle 86. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70a. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Figure 9:
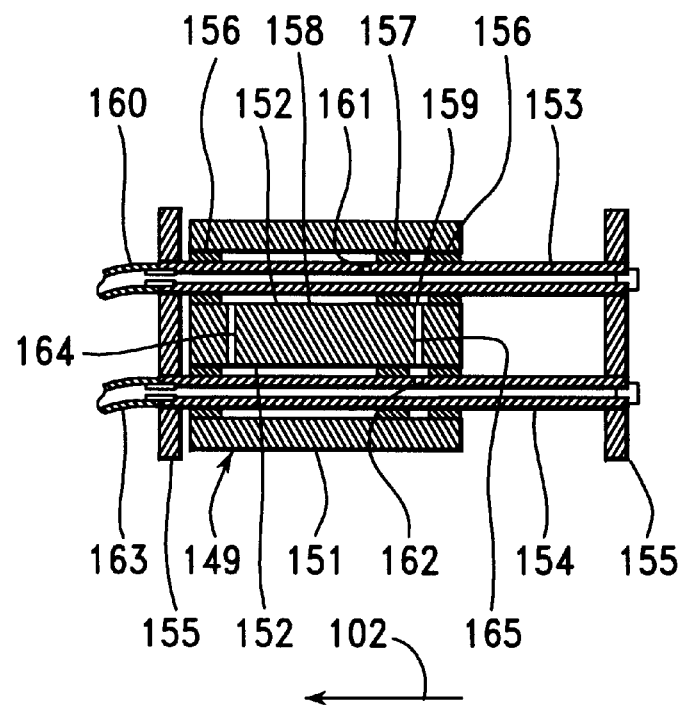
FIG. 9 is a cross-sectional plan view of a slider used to move cassettes filled with textured disks from one conveyer to another in the tool of FIG. 4.

FIG. 9 is a cross-sectional plan view of a slider mechanism 149 used to move a transfer table 150 on which cassettes are transferred from indexing conveyor 57 to output conveyor 61, taken as indicated by section lines IF—IF in FIG. 6..

Referring to FIGS. 6 and 9, the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154 by means of bearing assemblies 156, which also include air-tight seals preventing the outward flow of air from the ends of cylinders 152. A central piston 157 is also attached to slide with the slider 151 along each shaft 153, 154. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153. As this occurs, air is exhausted from outward chambers 159, through a hole 162 in shaft 154, and through hose 163. Both inward chambers 158 are connected by an inward transverse hole 164, and both outward chambers 159 are connected by an outward transverse hole 165. Thus, as compressed air is directed through hose 160 while hose 163 is exhausted to the atmosphere, the resulting expansion of inward chambers 158, together with a contraction of outward chambers 159, moves slider 151 inward, in the direction of arrow 102, aligning transfer table conveyor 60 with indexing conveyor 57.

Similarly, to move slider 151 outward, opposite the direction of arrow 102, compressed air is directed to the outward chambers 159, from hose 163, through hole 162 in shaft 154. As this occurs, air is exhausted from inward chambers 158, through hole 161 in shaft 153, and through hose 160. Thus, as compressed air is directed through hose 163 while hose 160 is exhausted to the atmosphere, the resulting expansion of outward chambers 159, together with a contraction of inward chambers 158, moves slider 151 outward, opposite the direction of arrow 102, aligning transfer table conveyor 60 with output conveyor 61.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table 150, which includes transfer table conveyor 60, in an outward direction, opposite the direction of arrow 102 along hollow shafts 153, 154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyer belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated as described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shutting mirror 138 is mounted on a mirror slide 176, together with a left shuttling mirror 178. Mirror slide 176 is operated pneumatically, sliding on a pair of shafts 180, using a mechanism operating generally as described above in reference to FIG. 9. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

This apparatus provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49, 172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

Referring again to FIGS. 5 and 5B, the preceding discussion has described a method for texturing disks using a laser beam system which has been manually adjusted to provide a certain overall power at a single beam 135 and for balancing the two beams 136m resulting from splitting the single beam 135. The laser beam system may alternately be set up by providing more laser power than necessary in the single beam 135 and by subsequently adjusting each beam 136m to a level defined by a set point, so that each beam 136m is attenuated during the adjustment process by the corresponding liquid crystal variable retarder 136b.

Figure 10:
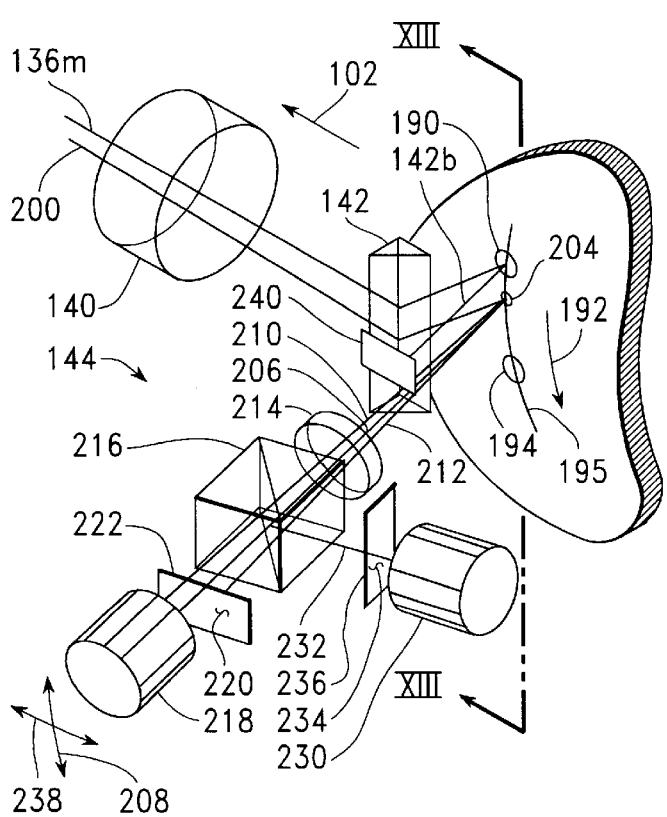
FIG. 10 is an isometric view of a beam angle detector for generating a signal indicating characteristics of a textured spot formed on a disk within the tool of FIG. 4.

FIG. 10 is an isometric view of a beam deflection detector, generally indicated as 144 and represented by a box structure in FIGS. 5 and 5C, for generating a signal indicating profile characteristics of the textured spots formed on the disk 49 by the process described above. As previously described in reference to FIG. 5C, the texturing beam 136m passes through an objective lens 140 and is reflected within a prism 142 to be focussed upon the surface of disk 49 in the form of an IR spot 190. A portion of the laser energy thus directed at the disk 49 is reflected away as a beam 142b. A pattern of textured spots is formed as the disk 49 is translated outward, opposite the direction 102, and rotated in the direction of arrow 192, so that a number of textured spots 194 are formed along a spiral path 196 on the surface of disk 49.

The profile of a textured spot 196 formed in this way is measured using a visible (red) laser beam 200 projected beneath the texturing beam 136m. This inspection beam 200 also passes through the objective lens 140 to be reflected within prism 142 and to be focussed into a spot 204 on the surface of disk 49. This visible spot 204 is smaller than the IR spot 190 which is used to form the textured spots 194. The inspection beam 200 is projected to strike the spiral path 196 on disk 49 at a position somewhat below the point at which the texturing laser beam 136m strikes this path 196. This displacement between the beams 136m and 200 provides time for the partially softened or melted material formed into a textured spot to solidify into the shape for which profile data is needed.

When the inspection beam 200 strikes a flat surface of disk 49, it is reflected as a central reflected beam 206. Since the inspection beam 200 traverses the central portion of a textured spot 194 along the path 196, the slopes of symmetrical features of the textured spot 194 deflect the reflected beam vertically, as indicated by arrow 208, between an upper reflected beam 210 and a lower reflected beam 212. These reflected beams 206, 210, 212 are directed through a collimating lens 214 and a beamsplitter 216 toward a primary photodetector 218.

Figure 11:
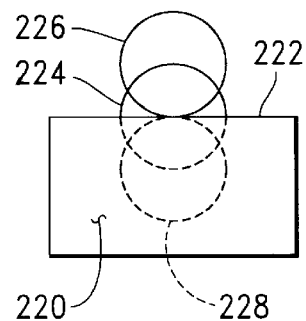
FIG. 11 is an elevational view of a reflected spot as seen by a photodetector within the beam angle detector of FIG. 10.

Continuing to refer to FIG. 10, and referring additionally to FIG. 11, FIG. 11 provides an elevational view of an illuminated spot formed by the reflection of the inspection beam off the various sloped surfaces of a textured spot 194. The path between the beamsplitter 216 and primary photodetector 218 is interrupted by a primary masking plate 220 having an upper edge 222 bisecting a central spot 224, which is formed along the central reflected beam 206. When the reflected beam is directed sufficiently upward by the local slope of a textured spot 194, an upper spot 226 is formed along the upper reflected beam 210. This upper spot 226 is entirely visible to the photodetector 218, being entirely above the upper edge 222 of masking plate 220. When the reflected beam is directed sufficiently downward by the local slope of a textured spot 194, a lower spot 228 is formed along the lower reflected beam 212. This lower spot 228 is entirely invisible to the photodetector 218, being entirely below the upper edge 222 of masking plate 220. Thus, as the reflected beam is deflected upward from the angle of the lower reflected beam 212 to the angle of upper reflected beam 210, the output of primary photodetector 218 is increased from a level indicating the presence of no light to a level indicating that the entire spot 226 is in view. Preferably, all of the deflections caused by surfaces of the textured spots 194 are within this range, so that the sensitivity of the measuring system to such deflections is maintained.

The beamsplitter 216 directs a portion of the reflected beam toward a secondary photodetector 230 in the form of a secondary reflected beam 232, past a secondary masking plate 234 having a vertical edge 236 bisecting a spot projected along the beam 232 projected at a central angle from a flat portion of the surface of disk 49. Thus, the output of secondary photodetector 230 is used to detect lateral deflection of the reflected beam, in the directions indicated by arrow 238. Significant variations in the output of this photodetector 230 provide an indication that the central portions of the textured spots 194 are not passing by the spot 204 formed with the inspection beam 200. The output of this photodetector 230 is used to adjust the placement of this spot 204 and is monitored to ensure that changes in such alignment have not occurred.

An entrance masking plate 240 is used to prevent the entrance of infrared energy, in the form of a beam 142b reflected from the surface of disk 49 during the formation of a textured spot 194, into the beam deflection detector 144. The visible beam reflected from the inspection beam 200 passes under this masking plate 240. In addition, a filter blocking the transmission of infrared energy may be placed in the light path of the beam deflection detector 144.

In an exemplary process, the infrared texturing beam is focussed into a spot 190, on the surface of disk 49, having a diameter of 10 microns. Pulses of this beam, forming individual textured spots 194 are repeated at a rate of 100,000 Hz, with an individual pulse thus occurring every 10 microseconds. The shape of a textured spot is measured by the beam deflection detector 144 at a time occurring about 1 microsecond after the textured spot is formed. The visible inspection beam 200 is focussed into a spot 204 having a diameter of 1.5 to 3.0 microns. The textured spot 190 is a bump or depression having a diameter of 5 to 10 microns. The textured spot 190 may alternately be a bump surrounded by a ridge having a diameter of about 15 microns. To allow the generation of sufficient data points during the passage of an individual textured spot 194 by the inspection beam 200, each photodetectors 218, 230 preferably has a rise time of 0.1 microseconds or less. The distance between adjacent textured spots 194 along the spiral path 196 is determined by the rotational speed of the disk 49. For example, the disk may be rotated at a speed producing movement along the path 196 at a speed of from 2.5 to 10 meters per second, resulting in a spacing between the centers of adjacent textured spots of 25 to 100 microns. In this example, the distance between the points at which the texturing beam 136m and the inspection beam 200 strike the surface of the disk 49 is one tenth the distance between adjacent textured spots.

Referring again to FIG. 5, and continuing to refer to FIG. 10, in a preferred embodiment of the present invention, the inspection beam 200 is derived from the output of the alignment laser diode 128, which is, for example, a 5-mW device producing a visible beam in the red range at 670 nanometers. As previously described in reference to FIG. 5, to provide a visible indication of the process of aligning various optical elements, the output beam from the alignment laser diode 128 is aligned to be coincident with the texturing beam, as these beams are combined in the dichroic beamsplitter 126. As described above in reference to FIG. 10, the inspection beam 200 is preferably aligned to strike the disk 49 below the point at which the texturing beam 136*m* hits the disk. Therefore, the output beam of the laser diode 128 must be realigned between its use in the alignment process and its use to produce the inspection beam 200. Furthermore, variation of the diameter of the laser beam is also desirable between these alignment and inspection operations.

Figure 12:
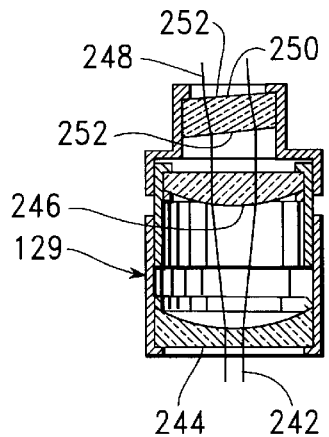
FIG. 12 is a longitudinal cross-sectional view of a beam expander modifying a visible laser beam for projection into the beam angle detector of FIG. 10.

Continuing to refer to FIGS. 5 and 10, and referring additionally to FIG. 12, FIG. 12 is a longitudinal cross-sectional view of a beam expander 129, which is installed adjacent the laser diode 128 during the inspection process (i.e., during the production of textured disks) to produce the inspection beam 200. During the process of aligning optical devices, the beam expander 129 is not placed in the optical path extending from the laser diode 128.

When the beam expander 129 is in place adjacent the laser diode 128, an input beam 242 from the laser diode 128 passes through a diverging lens 244 and a converging lens 246. These lenses, taken together, result in a collimated beam having the desired diameter. Because of a need, as described above, to project the inspection beam 200 to strike the disk 49 at an offset distance below the texturing beam 136*m*, an inspection beam 248 is offset and projected at an angle relative to the input beam 242 by means of a refractive element 250 including flat sides 252. The inspection beam 200 may be offset without a change in angle if these sides 252 are parallel to one another without being perpendicular to the input beam 242.

This preferred method of deriving the inspection beam has the advantages of eliminating a need for a separate laser for this purpose and of making use of the various optical elements described above in reference to FIGS. 5 and 5A–5C to perform their functions for both the texturing beam and the inspection beam. In this regard, after leaving the beamsplitter 126, the inspection beam 248 is divided into two approximately equal parts, forming individual inspection beams 200, within the non-polarizing beamsplitter 132, and is directed therefrom through the power control optics block 136. The shuttling mirror assembly 176 is used to direct the two inspection beams 200 to the disk actually being textured, on either right spindle 86 or on left spindle 184. The objective lenses 140 and prisms 142 focus and direct the inspection beams 200 to opposite sides of the disk being textured, as required to monitor the texturing process on both sides of the disk. This use of common optical elements eliminates a need for a number of additional optical elements, and simplifies the alignment of the texturing and inspection beams with one another.

Figure 13:
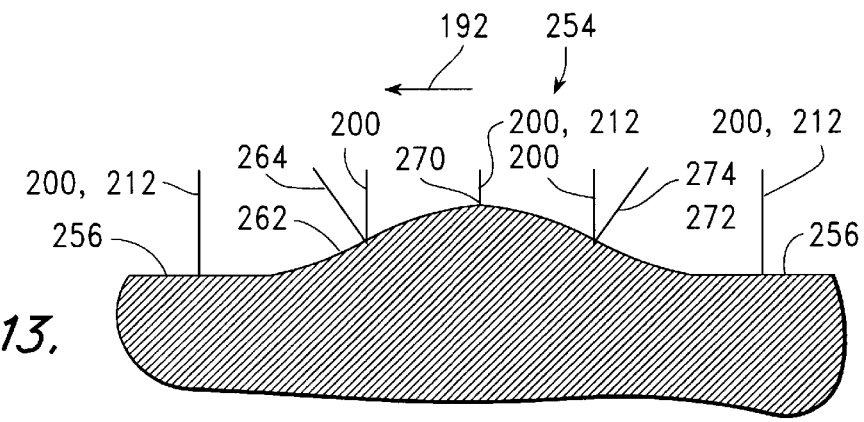
FIG. 13 is a cross-sectional view of a bump formed on a disk surface, showing the reflection of light rays into the beam angle detector of FIG. 10.

FIG. 13 is a cross-sectional view of a portion of a disk in which a bump 254 has been formed by the texturing process, taken as indicated by cross-section lines XIII—XIII in FIG. 10. As viewed in this direction, the inspection beam 200 appears to strike a flat surface 256 of the disk 49 perpendicularly, being reflected in the plane in which it is incident. This figure shows the inspection beam 200 striking the surface of the disk 49 in several positions with continued movement of the disk in the direction of arrow 192.

Figure 14:
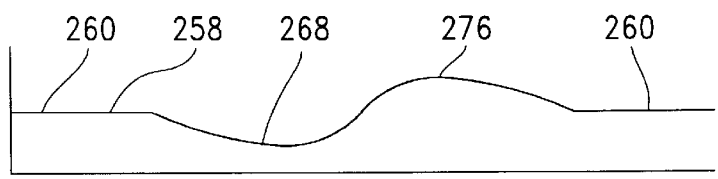
FIG. 14 is a graphical view of a signal provided by a photodetector within the beam angle detector of FIG. 10, in response to the passage of a the bump of FIG. 14.

FIG. 14 is a graphical view of an output signal 258 resulting from the output of the primary photodetector 218 during the passage of the bump 254 by the inspection beam 200.

Referring to FIGS. 10, 11, 13, and 14, when the flat surface of the disk 49 is struck by the inspection beam 200, the reflected beam is the central reflected beam 212, so that the photodetector 218 views the central spot 224 as shown in FIG. 11. Thus, while the inspection beam 200 is reflected from a flat surface 256, the output signal 258 remains at an intermediate level 260. When the disk 49 proceeds so that the inspection beam 200 strikes an outward-sloped surface 262 at the beginning of the bump 256, the reflected beam 264 is deflected downward, in the direction of arrow 192, reducing the level of output signal 258 as shown by the depression 268 of this signal. At the center 270 of the bump 254, the inspection beam 200 is again reflected as the central reflected beam 212. When the disk 49 proceeds so that the inspection beam 200 strikes an inward-sloped surface 272, causing the inspection beam 200 to be reflected upward as reflected beam 274, causing the output signal 258 to be increased in a raised portion.

In FIG. 13, the outward-extending features are greatly exaggerated for clarity. In an actual disk texturing application, the slopes forming the bump are much more gentle, so that the deflected beams 264, 274 fall within the ranges described in reference to FIGS. 10 and 11.

FIG. 15 is a cross-sectional view of a portion of a disk in which a textured spot 276, including a bump 278, surrounded by a depression 280 and a ridge 282, has been formed by the texturing process, again taken as indicated by cross-section lines XIII—XIII in FIG. 10.

FIG. 16 is a graphical view of an output signal 284 resulting from the output of the primary photodetector 218 during the passage of the textured spot 276 by the inspection beam 200.

Referring to FIGS. 10, 11, 15, and 16, the output signal 284 is at the median level generated with the inspection beam 200 reflected as central reflected beam 206 during the passage thereby of flat surfaces 286, ridge-top surfaces 288, depression-bottom surfaces 290, and the bump-top point 292. The inspection beam 200 is reflected downward, in the direction of arrow 192, during the passage thereby of outward-sloped ridge surfaces 294 and bump surface 296, causing the output signal 284 to be depressed below its median level. The inspection beam 200 is deflected upward, opposite the direction of arrow 192, during the passage thereby of inward-sloped ridge surfaces 298 and inward sloped bump surface 300.

FIG. 17 is an isometric view of an alternate beam deflection detector, generally indicated as 302, used to provide signals representing the profiles of textured spots 190. This alternative beam deflection detector 190 is similar to the beam deflection detector 144, described above in reference to FIGS. 10 and 11, with similar parts being afforded common reference numerals, except for the method used to detect variations in the deflection angle of the reflected inspection beam.

Referring to FIGS. 10 and 17, in the alternative apparatus 302, the masking plates 220, 234 are eliminated, and the photodetectors 218, 230 are replaced by linear charge-coupled devices (CCDs) 304, 306, each of which is a linear array, having a number of pixel elements arranged in a straight line. The primary CCD array 304 is vertically aligned to provide an output indicating angular deflection of the beam reflected from inspection beam 200, in the directions indicated by arrow 208, with such a beam being deflected from a central reflected beam upward toward a upper reflected beam 210 or downward toward a lower reflected beam 212. The secondary CCD array 306 is horizontally aligned to provide an output indicating angular deflection of the beam reflected from inspection beam 200, horizontally in the directions indicated by arrow 238. As previously described in reference to FIG. 10, a beamsplitter 216 is used so that the reflected beam is divided for detection by both of the CCD arrays 304, 306.

The image of the visible red spot 204 on each CCD array 304, 306 covers a number of adjacent pixel elements, with a location point for the reflected beam being determined by the pixel element receiving the most illumination or by the center of an adjacent number of pixel elements being illuminated above a pre-determined level. As the textured surfaces of FIGS. 13 and 15 are moved past the inspection beam 200, the movent of this location point for the reflected beam follows the general shape of the curves shown in FIGS. 14 and 16, respectively.

FIG. 18 is an isometric view of a second version 307 of the alternative beam deflection detector 302. Referring to FIGS. 17 and 18, in this alternative version 307, the beamsplitter 216 and the secondary CCD array 306 are eliminated, and the linear primary CCD array 304 is replaced by an area CCD array 308, having pixels arranged in a rectangular array. A location point for the reflected beam is determined by the pixel element receiving the most illumination or by the center, in both vertical and horizontal directions, of an adjacent number of pixel elements being illuminated above a pre-determined level. The vertical location of this location point is used to determine the vertical deflection, in the directions indicated by arrow 208, of the return beam, while the horizontal location of this location point is used to determine the horizontal deflection, in the directions indicated by arrow 238, of this beam.

Referring again to FIGS. 5 and 10, the output signal from primary photodetector 218 is used in one or more of a number of different ways within the laser texturing tool 37 and in associated systems. In a minimal way, this signal is displayed on a video screen, providing a real-time indication that the texturing process is indeed taking place. Additionally, this signal may be compared with one or more such signals in storage, with these stored signals being generated in the same manner from a surface having textured spots known to be satisfactory, or known to have minimum or maximum acceptable levels of material displacement. Furthermore, since a profile of surface can be obtained by integrating its slope, an actual representation of the profile, with data describing the height of raised features and the depth of depressed features, can be generated by integrating data derived from this signal. The process of deriving such data corrects for non-linearities introduced by the fact that the rate at which the area of a circular spot is uncovered by the edge 222 of masking plate 220 is not a linear function of the angle at which the return beam is deflected.

The data derived from this output signal may be used simply to provide operating personnel with an indication of the level of texturing being applied, to shut down the laser texturing tool 37 when textured spots are no longer being formed to conform to pre-determined standards, or to control texturing parameters. For example, the effective laser power and pulse duration may be changed in response to this signal.

Figure 19:
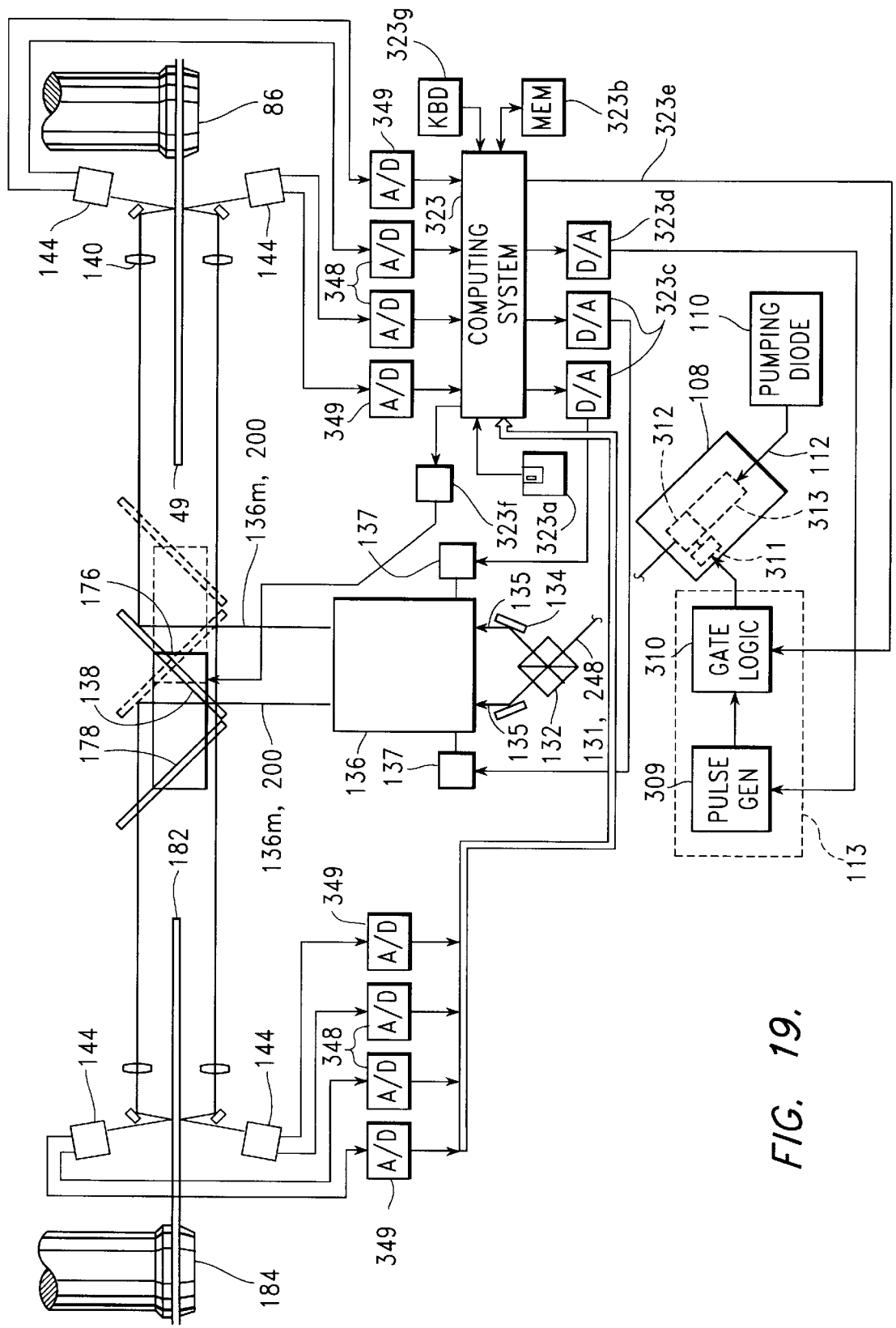
FIG. 19 is a schematic view of control apparatus using four of the beam angle detectors of FIG. 10 to control operation of a tool texturing both sides of disks on alternate spindles.

FIG. 19 is a partly schematic plan view of an embodiment of the present invention in which the output from the four beam deflection detectors 144 are used to vary both the levels of texturing laser energy reaching the disks 49 and 182, being textured on spindles 86 and 184, respectively, and to vary the shape of texturing pulses emitted from the texturing laser 108. A beam deflection detector 144 is positioned to view textured spots on each side of each disk 49, 182.

In the example of FIG. 19, the laser 108 is energized by diode pumping from a laser diode 110 through a fiber-optic cable 112, and is pulsed by a Q-switch control 113 including a pulse generator 309 to generate a square wave corresponding to the desired train of laser beam pulses, and gate logic 310 to determine when laser beam pulses occur. The laser 108 includes an oscillator 311 driving an acousto-optic Q-switch 312, within a laser cavity 313 in the laser 108, with a radio-frequency signal. When the Q-switch 310 is acoustically activated by this radio-frequency signal, it spoils the Q-factor of the laser cavity 313, stopping the emission of a laser beam. When the radio-frequency energy is turned off for a relatively short time, the laser is permitted to emit a laser beam pulse. In a typical production mode, the frequency of pulse generator 309 is set at 100 KHz, producing a pulse every 10 microseconds, while the oscillator 311 produces a radio-frequency wave at 80 MHz.

The level of power which may be delivered from pumping diode 110 depends on the type of laser 108 employed within the system. For example, one type of laser 108 uses up to 3 watts of power from pumping diode 110, while another type of laser 108 uses as much as 30 watts. Furthermore, the use of a different laser configuration suggests the use of different frequencies, with the pulse generator 309 operating, for example, at 70 KHz.

In the context of the disk texturing process described herein, it is particularly desirable to be able to vary the shape of each laser beam pulse within a train of such pulses. For example, in the production of textured spots of the type shown in FIG. 15, a longer pulse width (or greater pulse duration) tends to produce a higher rim 282 around the textured area, together with a lower central area within the rim 282. However, if a conventional means of varying the repetition rate (i.e. changing the frequency of the square wave pulses from pulse generator 309) is used, any attempt to change the wave shape also results in a change in the time between pulses, and, therefore, in a variation in the distance between textured spots on the disk. An attempt to correct this may result in further changes to spot size and in an unsatisfactory variation in the time required to complete the process of texturing a single disk. To overcome such difficulties, pulse generator 309 is configured to have a variable duty cycle.

FIGS. 20–22 are graphical views showing the effects of variations in the duty cycle of the signal driving the oscillator 311 on the shape of the laser pulse emitted. In each of these FIGS., a lower curve 314 represents a drive voltage applied from the pulse generator 309, through gate logic 310, as an input to oscillator 311. In the example of these FIGS. 20–22, when two volts is applied in this way, the oscillator 311 drives Q-switch 312 with radio-frequency energy, preventing the emission of a laser beam pulse, as shown in the upper laser beam power curve 316. Each FIG. 20–22 shows a 10-microsecond single pulse in a train of pulses generated at 100 KHz. In FIG. 20, the duty cycle (the ratio of time Q-switch 312 is driven with a radio-frequency signal divided by the total time of a cycle) is 45 percent. In FIG. 21, the duty cycle is 60 percent. In FIG. 22, the duty cycle is 75 percent.

In each FIG. 20–22, when the drive voltage is dropped, the laser output power rises rapidly along an initial curve portion 318 to a maximum level, and then falls along a second curve portion 320 to a much lower level at third curve portion 322, which continues until the drive voltage is restored. During the portion of each cycle preceding the laser pulse, energy is accumulated, with more energy being accumulated as a longer time is allowed for this purpose. Both the steepness of the subsequent rise in laser output power and the level to which this power rises are increased with the increased stored energy of pulses having higher duty cycles.

Thus, through the use of a pulse generator 309 having a variable duty cycle, an ability is gained to change the height and width of individual laser beam pulses, without changing the repetition rate of such pulses. This feature is especially useful in a texturing system used to texture disks formed with different materials or to texture disks according to multiple requirements.

Referring again to FIG. 19, the control of various texturing parameters is achieved through the use of a computing system 323, which includes a provision for reading program information stored on disks 323a and a memory 323b. The memory 323b may include, for example, random access system memory and hardfile storage. The outputs of the computing system 323 are used to drive various systems to establish operating conditions for the texturing process. For example, an input signal to each function generator 137, which controls the level at which a corresponding input beam 135 is attenuated within the power control optics block 136, is sent from the computing system 123 through a digital-to-analog convertor 323c. An input signal to the pulse generator 309, controlling the duty cycle of this generator 309 to effect changes in the shape of the laser beam pulses from texturing laser 108 is sent from the computing system 123 through a digital-to-analog convertor 323d. The computing system 323 also performs various sequencing functions, with an output signal on line 323e to gate logic 310 being used to turn the pulses from texturing laser 108 on through Q-switch 312 only when they are needed for texturing, and with an output signal to a solenoid valve 323f being used to control the position of shuttling mirrors 138, 178 through pneumatic slider 176.

Of the exemplary parameters controlled in this way, the pulse shape is applied simultaneously to each side of whichever disk 49 or 182 is being textured at a time. However, a different pulse shape may be applied to the disks 49 and 182 from opposite sides of the laser station. This kind of flexibility is particularly desirable in the event that different types of disks are to be textured on the two spindles 86, 184, or if disks from these spindles are otherwise to be textured according to differing specifications. In certain instances, the ability to texture disks according to differing specifications allows the laser texturing process to be used at a full rate of production when a limited number of disks textured to one of the specifications is required.

On the other hand, the laser power parameter is independently applied to each side of the disk 49 or 182 being textured, providing a type of control which is particularly important because of differences between the two beams 135 arising from beam splitter 132 at the beginning of the different optical paths extending to the sides of the disk being textured. This independence of control of the laser power attenuation arises from the fact that the liquid crystal variable retarders 136b (shown in FIG. 5B) within power control optics block 137 are independently driven by a pair of function generators 137 receiving input signals from computing system 323 through digital-to-analog converters 323c. Furthermore, these function generators 137 are preferably driven at independently adjustable levels according to the spindle 86 or 184 holding the disk currently being textured. This type of independent adjustment provides compensation for differences in the efficiency of transmitting laser beams along the optical paths leading to the disks on the different spindles 86, 184. This type of independent adjustment can also be used to facilitate texturing disks to differing specifications on the two spindles.

Thus, the computing system 323 stores, within memory 323b, independent levels for one or more parameters to be applied to disks being textured on the spindles 86 and 184. Since the computing system 323 controls the position of shuttling mirrors 138, 178 through solenoid valve assembly 323f, the location of the shuttling mirror is known within the system 323. This information is used to determine which of the two levels for each parameter to apply for the texturing of an individual disk.

Continuing to refer to FIG. 19, and referring additionally to FIG. 10, in accordance with the present invention, data representative of individual textured spots on each side of the disks 49, 182 is generated from signals provided by the four beam deflection detectors 144. The output of each primary photodetector 218 is fed through an analog-to-digital convertor 348 into the computing system 323. The output of each secondary photodetector 230 is fed through an analog-to-digital convertor 349 into the computing system 323. In the computing system 323, a program performing calculations to determine various parameters relating to the profiles of textured spots. This program has been loaded into the computing system 323 by means of one or more diskettes 323a, on which the program is magnetically recorded. These calculations develop profile data for textured spots, on each side of each of the disks 49, 182, based on the output signals derived from the primary photodetectors 218.

In a preferred version of this invention, the output of each secondary photodetector 230 is applied to determine when an error condition exists. For example, this output can be used to detect misalignment causing the inspection beam to pass textured spots in a path offset from their centers, and to detect the production of significantly unsymmetrical textured spots. Data indicating the presence of such an error condition can be used to activate a visible or audible alarm, or even to shut down the texturing process.

Since 100,000 textured spots per second are generated by the ongoing texturing process, a method for limiting the quantity of data which must be processed and stored may be needed. For example, most of the processing capability of the computing system 223 can be re-used for sequentially examined textured spots, with only a limited number of data bits or flags being stored between the examination of textured spots. Furthermore, since most of the factors effecting the profiles of textured spots can be expected to change rather slowly, the amount of data being handled can be limited by examining such data at a pre-determined sampling rate, such as every sixty-fourth such spot.

In general, to generate data describing the entire texturing process, the computing system 323 tracks four separate texturing profiles, one for each of the two sides of the disks 49 being textured on right spindle 86 and one for each of the two sides of the disks being textured on left spindle 184. To facilitate these calculations, the computing system 323 may be operated in a multitasking mode. However, since the disks on spindles 86, 184 are textured in an alternating fashion, the calculations performed with profile data from these disks are also performed in alternating fashion, reducing the processing load placed on the computing system 323.

Data collected this way may be displayed on a conventional display unit (not shown), providing inputs to a process in which calculations are made as described above for adjusting one or more parameters in the texturing process. Separate data is used for each side of each disk 49, 182.

Moreover, in a preferred version of this invention, this data is used to control various parameters of the texturing process on a real-time basis. For example, if a ridge is being formed around each textured spot, and if the height of this ridge is controlled by varying the duration of each laser pulse, the ridge heights calculated as described above is, for example, averaged, and the ideal ridge height is approached by varying an output from computing system 323 through a digital-to-analog convertor 323*d* to control the duty cycle of pulse generator 309. Another output from computing system 323 to gate logic 310, on line 323*e,* is used to turn the laser pulses on only when they are needed for the texturing process. If the overall depth of each textured spot is controlled by varying the power of the laser pulses, this depth of spots on each side of the disk 49, 182 is used to adjust the operating level the corresponding liquid crystal variable retarder 136*b* (shown in FIG. 5B) by controlling the voltage output of an associated function generator 137 through a digital-to-analog convertor 356. It is understood that, while these process controls are considered exemplary, a number of other controls over the texturing process may be varied through the use of the reflection angle detectors 144 and the computing system 323.

Despite the fact that changes are being made on the process texturing a disk in a real time basis, separate files are preferably kept within memory 323*b* for the application of the texturing process to disks on right spindle 86 and on left spindle 184. Thus, the parameters determined to be correct by the end of the process of texturing a disk on right spindle 86 may be used to begin the process of texturing the next disk on right spindle 86, while the parameters determined to be correct by the end of the process of texturing a disk on left spindle 184 is used to begin the process of texturing the next disk on this spindle 184. Since the spindles 86, 184 are used in an alternating fashion, the values of these parameters for a disk on each spindle must be stored as a disk is textured on the other spindle. Furthermore, the use of separate files for processing disks on each spindle allows the storage of different ideal and initial values for parameters, so that disks of differing materials, or disks to be textured to differing specifications may be processed on the two spindles 86, 184.

While the above discussion in reference to FIG. 19 has described the use of beam angle detectors 144, as described in reference FIG. 10, the use, with a computing system, of alternate forms of beam angle detectors, such as those described in reference to FIGS. 17 and 18, are understood to be within the scope of the present invention.

While the invention has been described in a form simultaneously texturing both sides of an individual disk, it is understood that the invention can readily be applied to a system texturing only one side of an individual disk at a time.

While the invention has been described in a particular application for texturing magnetic disks, it is understood that this invention can also be applied to the texturing of other types of substrates.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for applying a textured pattern to a substrate surface and for determining topographical properties of said textured pattern, wherein said apparatus comprises:

texturing means for forming a plurality of textured spots on said substrate surface at a texturing location within said apparatus;

drive means for moving said substrate surface past said texturing location along a predetermined path;

projection means for projecting a detectable beam to an inspection point along said predetermined path, with central portions of said textured spots moving past said inspection point in a first direction;

primary beam angle detection means for detecting deflection of a reflection of said detectable beam from said substrate surface in said first direction and opposite thereto, wherein said primary beam angle detection means produces a first output signal indicating the angular deflection in said first direction and opposite thereto of the reflection of said detectable beam in response to changes in the angular orientation of a portion of a textured spot illuminated by said detectable beam.

2. The apparatus of claim 1, comprising additionally secondary beam angle detection means for detecting deflection of a reflection of said detectable beam from said substrate surface perpendicular to said first direction wherein said secondary beam angle detection means produces a first output signal indicating the angular deflection perpendicular to said first direction of the reflection of said detectable beam in response to changes in the angular orientation of a portion of said textured spot illuminated by said detectable beam.

3. Apparatus for applying a textured pattern to a substrate surface and for determining topographical properties of said textured pattern, wherein said apparatus comprises:

texturing means for forming a plurality of textured spots on said substrate surface at a texturing location within said apparatus;

drive means for moving said substrate surface past said texturing location along a predetermined path;

projection means for projecting a detectable beam to an inspection point along said predetermined path, with central portions of said textured spots moving past said inspection point in a first direction;

primary beam angle detection means for detecting deflection of a reflection of said detectable beam from said substrate surface in said first direction and opposite thereto; wherein said primary beam angle detection means includes a primary detector sensitive to power levels of said detectable beam, and primary masking means blocking, from said primary detector, a median portion of a reflection of said detectable beam as said detectable beam is reflected off a flat surface of said substrate at a first angle of reflection, and allowing varying portions of said reflection to pass to said primary detector in response to deflection of said reflection in said first direction from said first angle of reflection.

4. The apparatus of claim 3, wherein said projection means includes a light source, wherein said detectable beam is composed of a light beam, wherein said primary detector includes a primary photodetector, and wherein said primary masking means includes a primary masking plate having a masking edge extending perpendicular to said first direction, with said masking edge bisecting a reflection of said light beam off a flat surface of said substrate at said first angle of reflection.

5. The apparatus of claim 3, wherein said projection mean includes a light source, wherein said detectable beam is composed of a light beam, wherein said primary detector includes a primary photodetector, wherein said apparatus additionally comprises a beamsplitter directing a primary portion of a reflection of said light beam off said substrate at said inspection point past a primary masking plate to said primary photodetector, and a secondary portion of said reflection past a secondary masking plate to a secondary photodetector, wherein said primary masking plate includes an edge bisecting said primary portion of said reflection as said light beam is reflected off a flat surface of said substrate at a first angle of reflection, with said primary masking plate passing varying portions of said primary portion of said reflection as said reflection is deflected from said first angle in said first direction and opposite thereto, and wherein said secondary masking plate includes an edge bisecting said secondary portion of said reflection as said light beam is reflected off said flat surface of said substrate at said first angle of reflection, with said secondary masking plate passing varying portions of said secondary portion of said reflection as said reflected light beam is deflected from said first angle in a direction perpendicular to said first direction.

6. The apparatus of claim 1, wherein said projection means includes a light source, wherein said detectable beam is composed of a light beam, and wherein said primary beam angle detection means includes a primary array of photosensitive pixel elements, with a central portion of said primary array being illuminated by a reflection of said light beam as said light beam is reflected off a flat surface of said substrate at a first angle of reflection.

7. The apparatus of claim 6, wherein said primary array is rectangular, with said reflection traversing said primary array in said first direction as said reflection is deflected from said first angle of reflection in said first direction, and with said reflection traversing said primary array in a direction perpendicular to said first direction as said reflection is deflected from said first angle of reflection in a direction perpendicular to said first direction.

8. The apparatus of claim 6, wherein said apparatus additionally comprises a beamsplitter directing a primary portion of said reflection to said primary array and a secondary portion of said reflection to a secondary array, wherein said primary array is linear, extending in a second direction, with said reflection traversing said primary array in said second direction as said reflection is deflected from said first angle of reflection in said first direction, and wherein said secondary array is linear, extending in a third direction, with said reflection traversing said secondary array in said third direction as said reflection is deflected from said first angle of reflection in a direction perpendicular to said first direction.

9. The apparatus of claim 1, wherein said texturing means includes a pulsed laser beam directed along an optical path including a number of focussing and directing elements, and wherein said projection means includes a light source directing a light beam along said optical path.

10. Apparatus for applying a textured pattern to opposite sides of a disk and for determining topographical properties of said textured pattern on each side of said disk, wherein said apparatus comprises:

drive means for rotating and translating said disk;

a pulsed laser for surface texturing;

an inspection laser;

an optical path along which a texturing beam from said pulsed laser and an inspection beam from said inspection laser are directed, with said optical path including a beamsplitter dividing said texturing beam into texturing sub-beams directed at texturing points on opposite sides of said disk and dividing said inspection beam into inspection sub-beams directed at inspection points on opposite sides of said disk, with each said texturing sub-beam forming a plurality of textured spots along a pre-determined path on said disk, and with central portions of said textured spots moving path each of said inspection points; and primary beam angle detection means adjacent each side of said disk for detecting deflection of a reflection of said inspection sub-beam from said disk surface in a first direction along said pre-determined path and opposite said first direction wherein said primary beam angle detection means produces a first output signal indicating the angular deflection in said first direction and opposite thereto of the reflection of said inspection sub-beam in response to changes in the angular orientation of a portion of a textured spot illuminated by said inspection sub-beam.

11. The apparatus of claim 10 additionally comprising control means for controlling said pulsed laser in response to a signal from said primary beam angle detection means.

12. The apparatus of claim 11, additionally comprising secondary beam angle detection means adjacent each side of said disk for detecting deflection of a reflection of said inspection beam from said disk surface in a direction perpendicular to said first direction, wherein said secondary beam angle detection means produces a first output signal indicating the angular deflection perpendicular to said first direction of the reflection of said inspection sub-beam in response to changes in the angular orientation of a portion of said textured spot illuminated by said inspection sub-beam.

13. The apparatus of claim 12, additionally comprising alarm means responsive to a signal from said secondary beam angle detection means.

14. Apparatus for applying a textured pattern to opposite sides of a disk and for determining topographical properties of said textured pattern on each side of said disk, wherein said apparatus comprises:

drive means for rotating and translating said disk;

a pulsed laser for surface texturing;

an inspection laser;

an optical path along which a texturing beam from said pulsed laser and an inspection beam from said inspection laser are directed, with said optical path including a beamsplitter dividing said texturing beam into texturing sub-beams directed at texturing points on opposite sides of said disk and dividing said inspection beam into inspection sub-beams directed at inspection points on opposite sides of said disk, with each said texturing sub-beam forming a plurality of textured spots along a pre-determined path on said disk, and with central portions of said textured spots moving path each of said inspection points; and primary beam angle detection means adjacent each side of said disk for detecting deflection of a reflection of an inspection sub-beam from said disk surface in a first direction along said pre-determined path and opposite said first direction, wherein said primary beam angle detection means includes a primary detector sensitive to power levels of said inspection sub-beam, and primary masking means blocking, from said primary detector, a median portion of a reflection of said inspection sub-beam as said inspection sub-beam is reflected off a flat surface of said substrate at a first angle of reflection, and allowing varying portions of said reflection to pass to said primary detector in response to deflection of said reflection in said first direction from said first angle of reflection.

15. The apparatus of claim 14, additionally comprising control means for controlling said pulsed laser in response to a signal from said primary beam angle detection means.

16. Apparatus for applying a textured pattern to opposite sides of a disk and for determining topographical properties of said textured pattern on each side of said disk, wherein said apparatus comprises:

drive means for rotating and translating said disk;

a pulsed laser for surface texturing;

an inspection laser;

an optical path along which a texturing beam from said pulsed laser and an inspection beam from said inspection laser are directed, with said optical path including a first beamsplitter dividing said texturing beam into texturing sub-beams directed at texturing points on opposite sides of said disk and dividing said inspection beam into inspection sub-beams directed at inspection points on opposite sides of said disk, with each said texturing sub-beam forming a plurality of textured spots along a pre-determined path on said disk, and with central portions of said textured spots moving path each of said inspection points; and beam angle detection means adjacent each side of said disk for detecting deflection of a reflection of said inspection sub-beam from said disk surface, wherein each said beam angle detection means includes a primary photodetector, a secondary photodetector, a second beamsplitter, a primary masking plate extending between said second beamsplitter and said primary photodetector, and a secondary masking plate extending between said second beamsplitter and said secondary photodetector, wherein each said second beamsplitter directs primary portion of said reflection of said inspection sub-beam to said primary photodetector and a secondary portion of said reflection of said inspection sub-beam to said secondary photodetector, wherein said primary masking plate includes an edge bisecting said primary portion of said reflection as said light beam is reflected off a flat surface of said substrate at a first angle of reflection, with said primary masking plate passing varying portions of said primary portion of said reflection as said reflection is deflected from said first angle in said first direction and opposite thereto, and wherein said secondary masking plate includes an edge bisecting said secondary portion of said reflection as said light beam is reflected off said flat surface of said substrate at said first angle of reflection, with said secondary masking plate passing varying portions of said secondary portion of said reflection as said reflected light beam is deflected from said first angle in a direction perpendicular to said first direction.

17. The apparatus of claim 16, additionally comprising alarm means responsive to a signal from said secondary beam angle detection means.

* * * * *